(12) United States Patent
Handy

(10) Patent No.: US 7,784,476 B2
(45) Date of Patent: Aug. 31, 2010

(54) PORTABLE CONVEYOR CLEANING ASSEMBLY

(76) Inventor: Keith David Handy, Granville House, Granville Terrace, Stone Staffordshire ST15 8DF (GB)

( * ) Notice: Subject to any disclaimer, the term of this patent is extended or adjusted under 35 U.S.C. 154(b) by 713 days.

(21) Appl. No.: 10/598,426

(22) PCT Filed: Mar. 10, 2005

(86) PCT No.: PCT/GB2005/000910
§ 371 (c)(1),
(2), (4) Date: Aug. 29, 2006

(87) PCT Pub. No.: WO2005/087395
PCT Pub. Date: Sep. 22, 2005

(65) Prior Publication Data
US 2007/0170040 A1 Jul. 26, 2007

(30) Foreign Application Priority Data
Mar. 12, 2004 (GB) .................................. 0405571.1

(51) Int. Cl.
*B08B 3/02* (2006.01)
*B65G 45/22* (2006.01)

(52) U.S. Cl. ........................ 134/129; 134/172; 198/495

(58) Field of Classification Search ................ 134/172, 134/124, 125, 129, 131; 198/495, 499
See application file for complete search history.

(56) References Cited

U.S. PATENT DOCUMENTS

| 3,122,235 | A | * | 2/1964 | Meeker et al. | ............... | 198/794 |
| 5,117,967 | A | * | 6/1992 | Morrow et al. | ............... | 198/495 |
| 5,706,932 | A | * | 1/1998 | White | ........ | 198/495 |
| 6,244,423 | B1 | * | 6/2001 | Tacchi et al. | ................ | 198/495 |
| 7,044,287 | B1 | * | 5/2006 | Gray | ........... | 198/495 |
| 2004/0222066 | A1 | * | 11/2004 | Hall | ........... | 198/499 |
| 2007/0170040 | A1 | * | 7/2007 | Handy | ......... | 198/495 |

FOREIGN PATENT DOCUMENTS

| EP | 0820956 | | 1/1998 |
| EP | 0820956 | A1 * | 5/1998 |
| WO | 0168276 | | 9/2001 |

* cited by examiner

*Primary Examiner*—Joseph L Perrin
(74) *Attorney, Agent, or Firm*—Chernoff, Vilhauer, McClung & Stenzel

(57) ABSTRACT

A portable conveyor cleaning assembly with adjustable first and second end assemblies selectively mountable on respective sides of different width conveyors. A carriage is movable reciprocally over the conveyor to direct a cleaning fluid onto the conveyor, with the degree of reciprocal movement being adjustable to suit a particular conveyor.

20 Claims, 4 Drawing Sheets

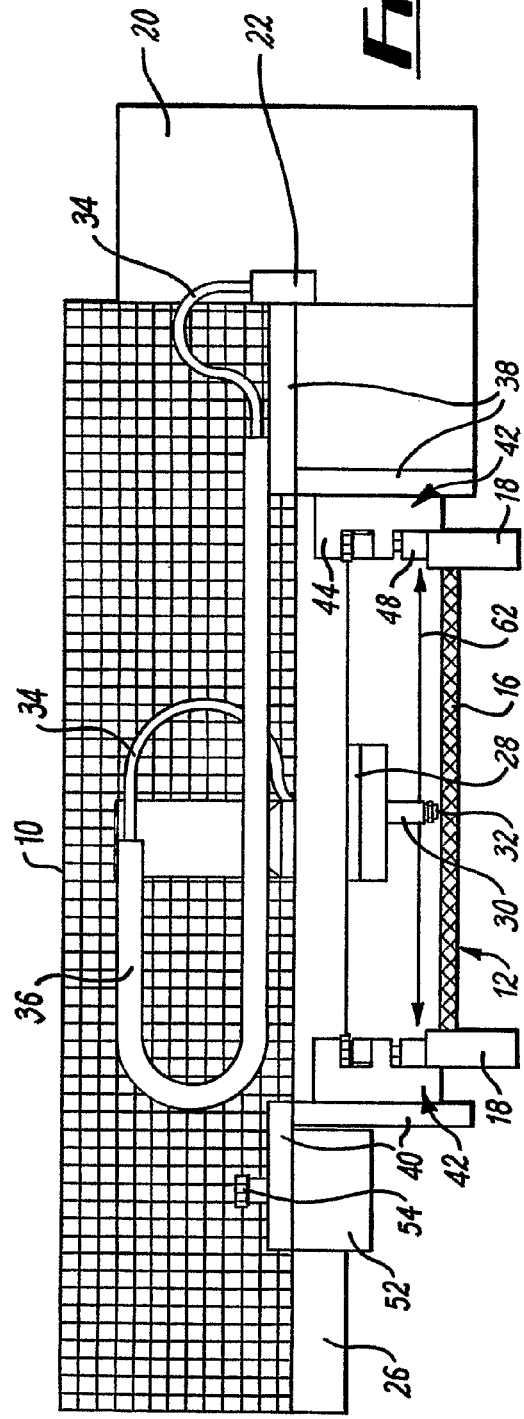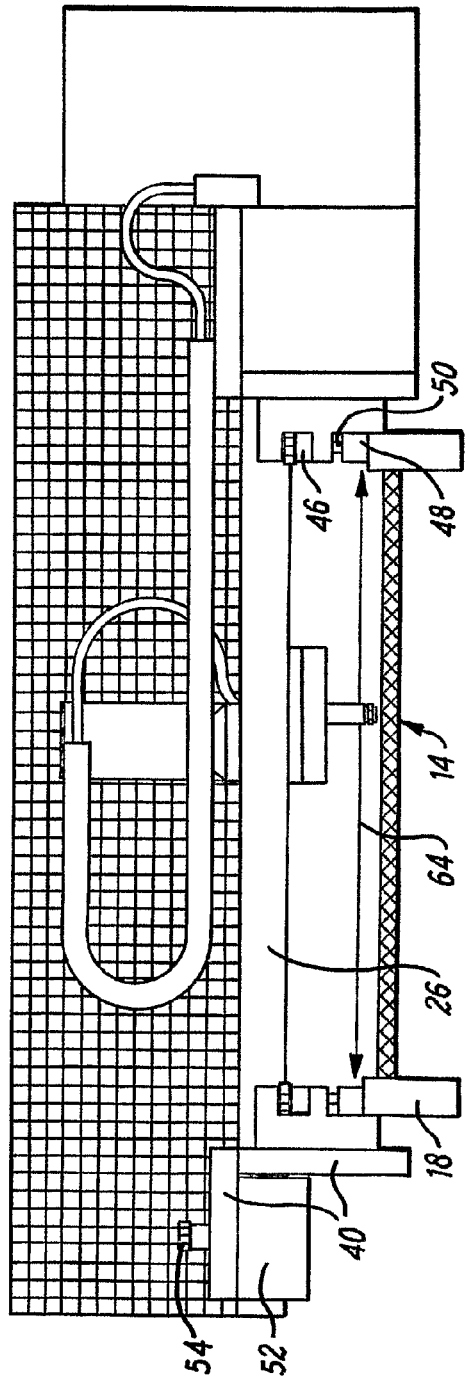

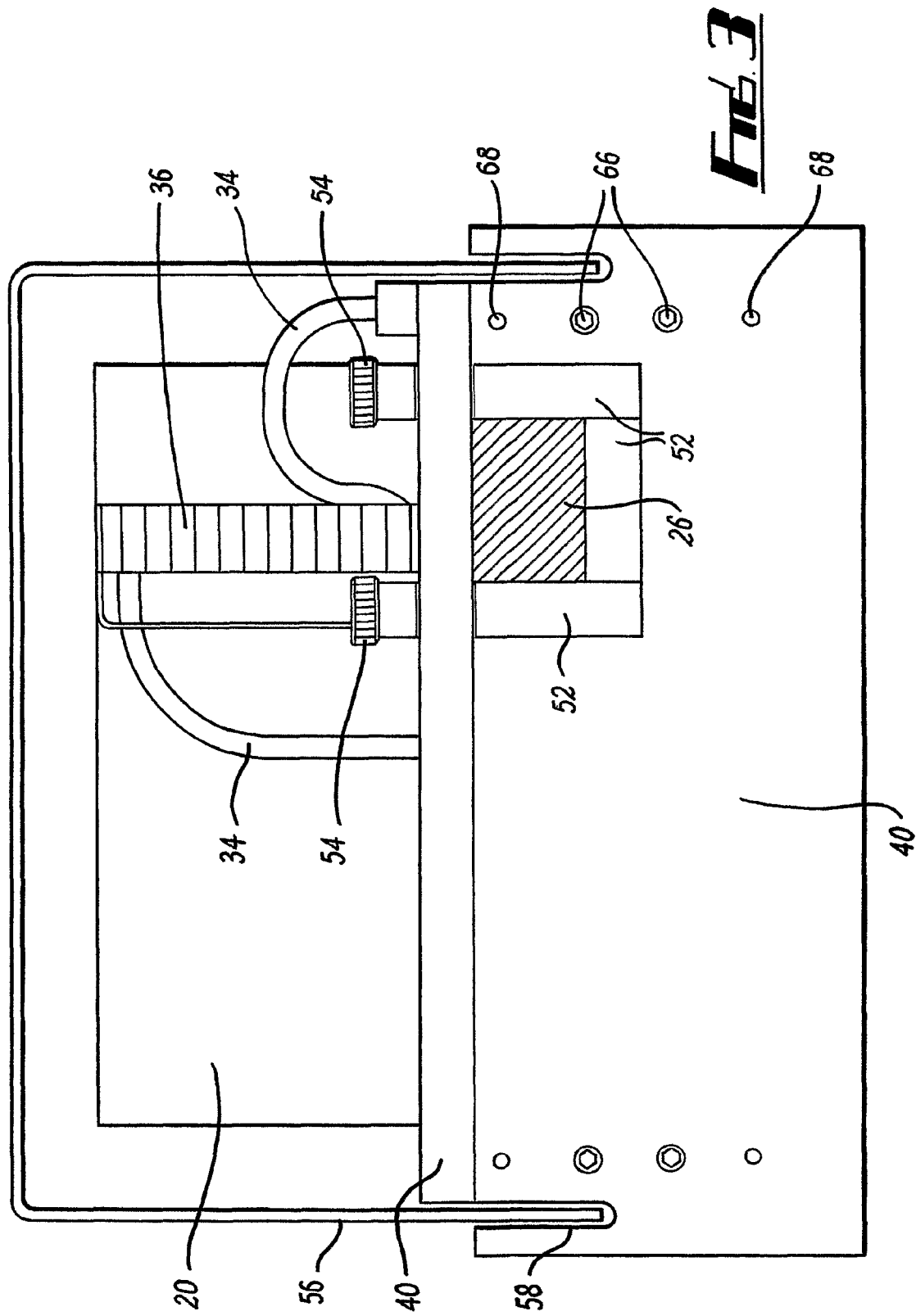

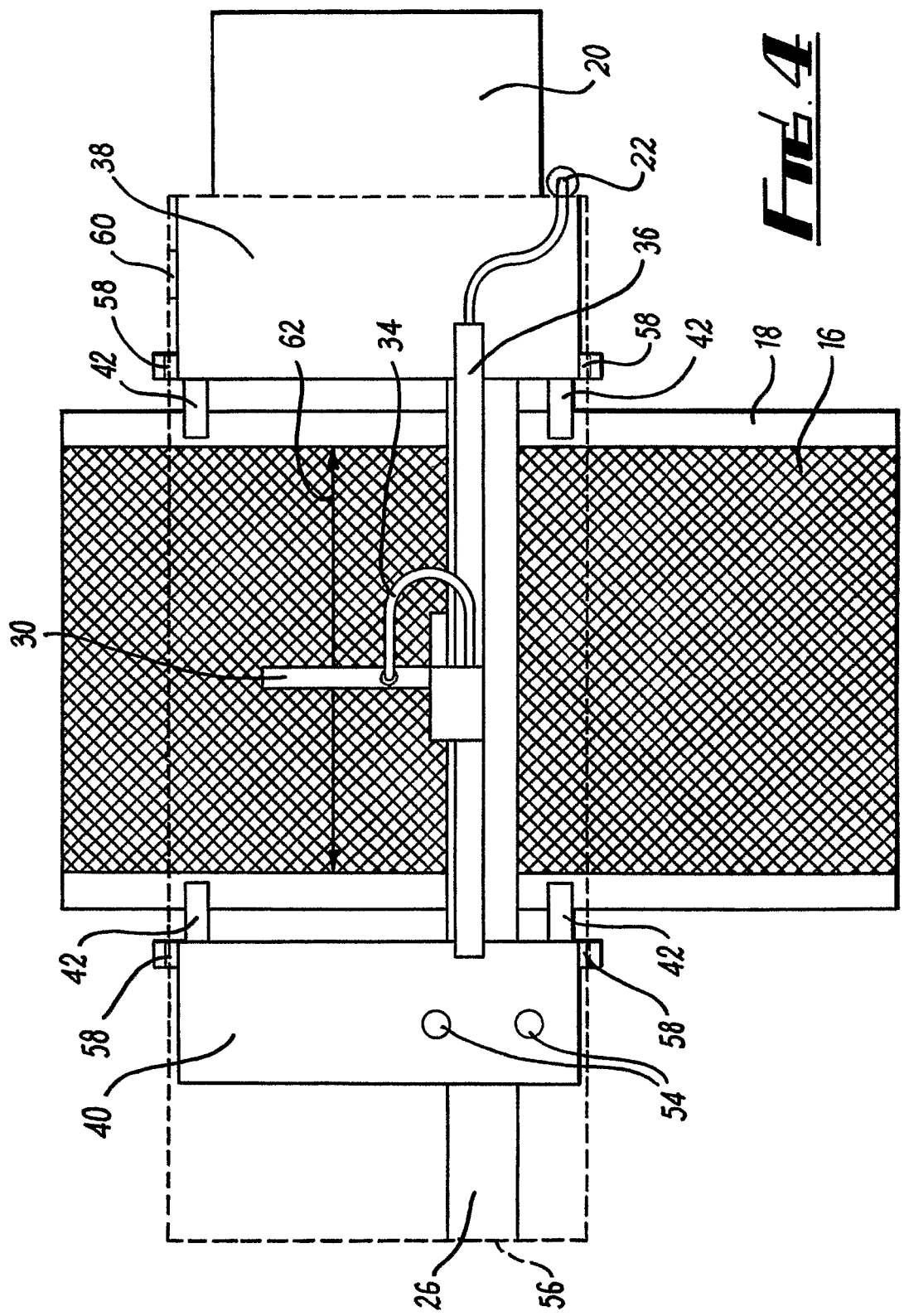

PORTABLE CONVEYOR CLEANING ASSEMBLY

This is a national stage application filed under 35 USC 371 based on International Application No. PCT/GB2005/000910 filed Mar. 10, 2005, and claims priority under 35 USC 119 of United Kingdom Patent Application No. 0405571.1 filed Mar. 12, 2004.

This invention relates to a portable cleaning assembly, and particularly but not exclusively such an assembly for cleaning conveyors.

Conveyors are used in a wide range of applications including for instance the food industry. In establishments such as bakeries a number of such conveyors may be used, which conveyors may be a wide range of different widths. Such conveyors often have a mesh or interlinked structure and difficulties can be encountered in cleaning such conveyors. If adequate cleaning is not carried out this can result in spoiling of the food products. The use of chemical cleaners which can enhance cleaning, can however result in potential contamination of food products. To provide an adequate cleaning assembly on each conveyor will, often however prove prohibitively expensive.

According to the present invention there is provided a portable cleaning assembly, the assembly including an elongate reciprocal movement providing means, said means including an elongate body and a carriage member movable in a reciprocal manner along a required proportion of the body, a cleaning member mounted on the carriage for cleaning an item, the assembly also including a first engagement member engageable with an item to be cleaned towards a first side of the item, and a second engagement member engageable with the item towards an opposite side thereof, the second engagement member being adjustably mounted on said elongate body so as to be provided at a required spacing from the first engagement member for a particular item to be cleaned.

The second engagement member is preferably slidably mounted on the elongate body, and means may be provided for locking the second engagement member at a required position on the body.

The first and/or second engagement members may include height adjustment means engageable with the item to provide the cleaning member at a required spacing from the item.

The reciprocal movement providing means may include a selectively rotatable endless line means located in the body, with the carriage member attached to the line means. The line means may be a belt or chain. The reciprocal movement providing means may include clutch means such that the carriage member will not move if a resistive force above a predetermined level is encountered. The speed of reciprocal movement is preferably selectively adjustable.

The cleaning member may include means for projecting fluid onto the item, which fluid may be any of steam, water or other liquid, or air. In an alternative arrangement the cleaning member may be engageable with the item, and the cleaning member may include any of a rotating or fixed brush, vacuum system, or scraper.

The assembly may include a removable safety cover, and the assembly may be configured so as to only be operable when the safety cover is in place. The safety cover may be locatable in formations on the first and second engagement members, which formations may be slots.

The proportion of the elongate body along which the carriage moves may be adjustable, and may be manually adjustable.

One or more sensors may be provided on the elongate body to detect the position of the carriage to cause a required limitation of the movement thereof along the body.

The assembly may be arranged such that the proportion of the elongate body along which the carriage moves is automatically determined by the location of the second engagement member on the elongate body.

The invention also provides a portable conveyor cleaning assembly, the assembly being according to any of the preceding nine paragraphs, with the first and second engagement members being locatable on respective side structures of a conveyor.

An embodiment of the present invention will now be described by way of example only and with reference to the accompanying drawings, in which:

FIG. 1 is a diagrammatic side view of a cleaning assembly according to the invention in use in cleaning a first conveyor;

FIG. 2 is a similar view to FIG. 1 but with the assembly cleaning a second wider conveyor;

FIG. 3 is a diagrammatic end view of the assembly of FIGS. 1 and 2; and

FIGS. 4 and 5 are respectively plan views of the assembly in use on the first and second conveyors.

Figure 5:
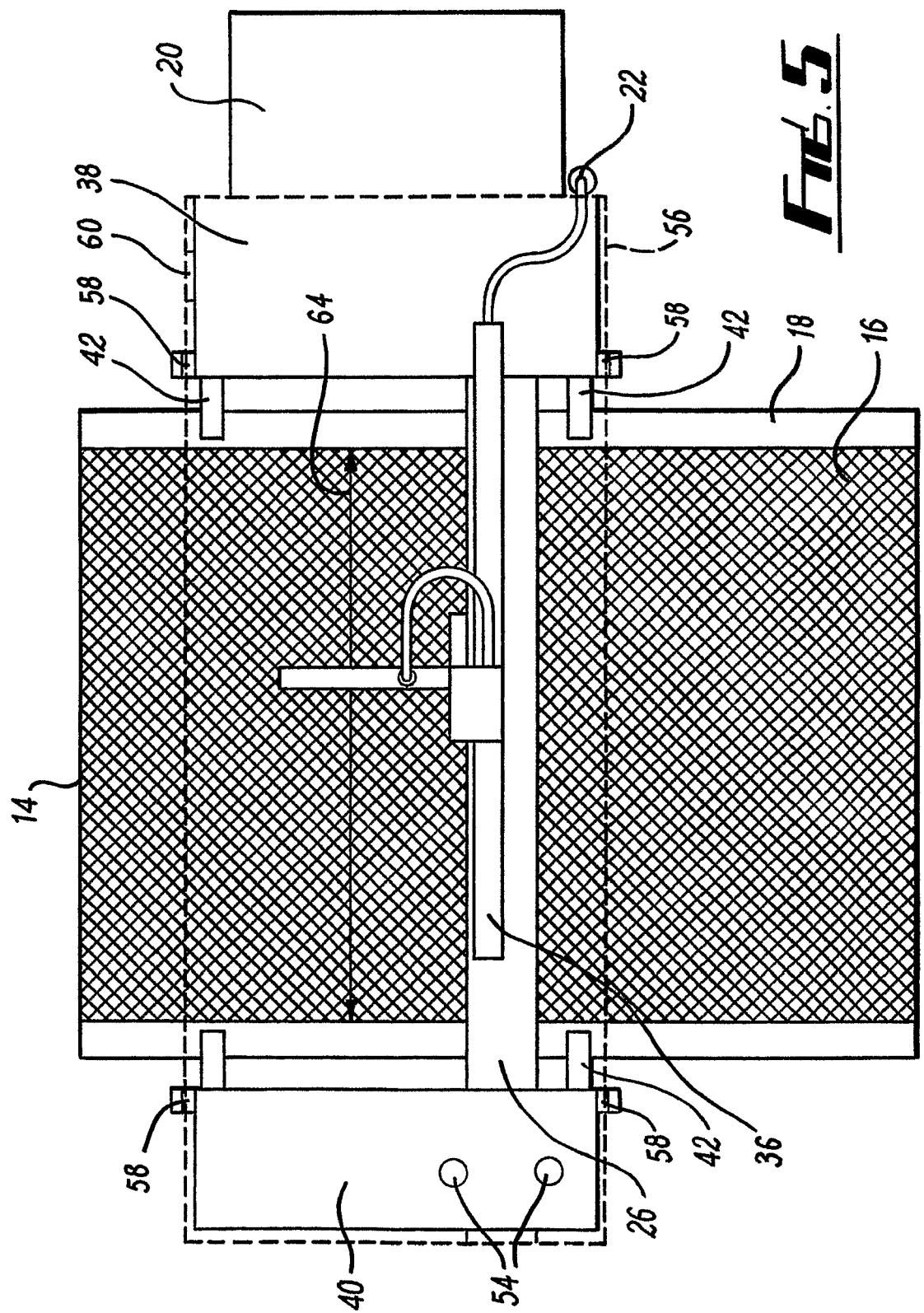

The drawings show a cleaning assembly 10 in use cleaning either a first conveyor 12 or a second wider conveyor 14. The conveyors 12, 14 each comprise a mesh belt 16 which extends between side structures 18.

The assembly 10 comprises a control box 20 including a supply 22, in this instance of steam. An elongate variable speed reciprocal movement providing means 24 extends laterally from the control box 20 and includes an elongate rectangular cross-section body 26. Located within the body 26 is an endless belt (not shown) driven by an appropriate mechanism (not shown) including a clutch configuration which permits slippage to occur if a reactive force above a predetermined level is encountered thereby. A slot (not shown) is provided on the underside of the body 26 to provide access to the belt, and a carriage 28 is mounted to the belt through the slot.

The carriage 28 carries a cleaning member in the form of a manifold 30 with a plurality of downwardly directed jets 32. A supply pipe 34 extends from the manifold 30 and is carried by a flexible conduit 36 in a loop on top of the body 26, to connect to the steam supply 22.

First and second end assemblies 38, 40 are provided. The first assembly 38 is attached to the control box 20. The assembly 38 includes a spaced pair of height adjusters 42 engageable with the respective conveyor side structure 18. Each height adjuster 42 includes an F shape section bracket 44 which locates a threaded thumb wheel 46 between the side limbs of the F, with a foot 48 below the side limbs of the F, mounted on a threaded bar extending through the bracket 44, such that rotation of the thumb wheel 46 raises and lowers the foot 48. Two similar spaced height adjusters 42 are provided on the second end assembly 40. The end assembly 40 is slidably mounted on the elongate body 26 by virtue of a sleeve arrangement 52. Two clamp screws 54 extend in to the sleeve arrangement 52 such that tightening of the screws 54 locks the sleeve arrangement 52, and hence end assembly 40, on the body 26.

A safety guard 56 in the form of a mesh cage is provided which locates in four slots 58, each provided on a respective side of one of the end assemblies 38, 40. The slots 58 enable relative movement between the end assembly 40 and the guard 56, allowing the same guard 56 to be used in different locations. A proximity safety switch 60 is provided on the fixed end assembly 38 spaced from a one of the slots 58. The safety switch 60 is connected to the control box 20 to prevent operation of the assembly 10 if the safety guard 46 is not detected as being in position.

In use with the clamp screws 54 loosened, the end assembly 40 can be slid to an appropriate position on the body 26 to fit on the side structure 18 of a particular conveyor. Once the height adjusters 42 are located in correct positions on the respective side structures 18, the clamp screws 54 can be tightened to provide a required operating width for the assembly 10. The height adjusters 42 can then be adjusted by manipulating the respective thumb wheels 46 to provide a required height of the jets 32 above the mesh conveyor 16.

Once a correct height has been determined, using the control box 20 the amount of reciprocal movement of the carriage 28 and hence jets 32 can be set to provide full cleaning of the mesh 16. The amount of reciprocal movement of the jets 32 is shown by the line 62 in FIGS. 1 and 4. One or more sensors (not shown) may be provided on the assembly to detect the position of the carriage or jets. The amount of movement may be determined as the amount of permitted movement from the sensor or sensors. The speed of the reciprocal movement can be set as required for the type/speed of conveyor belt, and/or the level of soiling.

When required the assembly 10 can readily be moved for use with a different conveyor such as the wider conveyor 14 as shown in FIGS. 2 and 5. For use on the conveyor 14, the safety guard 56 is lifted off, and following loosening of the screws 54 the end assembly 40 will be moved to the left as shown in the drawings. Once the assembly 10 is correctly fitted on to the conveyor 14, the safety guard 56 is replaced so as to locate in the slots 58 irrespective of the position of the end assembly 40. The control box 20 is used to provide a greater extent of reciprocal movement of the jets 32, as shown by the line 64.

If required extra height adjustment can be obtained by altering the mounting of the height adjusters 42 on the end assemblies 38, 40. FIG. 3 illustrates the height adjusters 42 mounted to a middle pair of mounting holes 66, but alternative lower and higher mounting holes 68 are illustrated. Such holes may be usable for example where there is a particular recess on a conveyor.

There is thus described a portable cleaning assembly 10 usable on a wide range of different size, conveyors. This means that one or more such assemblies could be used in a particular location to clean a wide range of different size conveyors, thus making it economically practical to clean a number of different size conveyors, whilst only requiring one or more cleaning assemblies. The same safety guard is usable with different size conveyors. The height adjustment in the assembly 10 permits thorough cleaning of conveyors, even where these have a somewhat different configuration. The assembly has a relatively straightforward configuration and can thus be inexpensively and robustly manufactured for regular low maintenance operation in a wide range of locations.

Various modifications may be made without departing from the scope of the invention. For example, a different cleaning system may be used, and rather than steam, a liquid such as water or a chemical cleaner may be used, or air could also be used. It may be that a contact cleaning process is used. For instance, a rotating or fixed brush could be used, or alternatively a vacuum system, scraper or other arrangement could be provided. A different safety guard can be provided. For instance with some cleaning systems a solid rather than mesh guard may be provided. A solid guard contains splashes, whilst a mesh guard prevents build up of condensation.

Rather than a manual adjustment of the reciprocal movement, sensors could be provided such that the amount of linear movement is automatically determined by the spacing between the end assemblies. Reciprocal movement could be provided other than by an endless belt, and could be provided by a screw mechanism or pneumatic operation.

The movement of the cleaning member in use need not be in a reciprocal manner, and the cleaning member could operate only, or particularly, at specific parts of a conveyor or other item to be cleaned. The invention is usable in cleaning arrangements for a wide range of applications other than conveyors.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A portable cleaning assembly, the assembly including an elongate reciprocal movement providing means, said means including an elongate body and a carriage member movable in a reciprocal manner along the body, a cleaning member mounted on the carriage for cleaning an item, the assembly also including a first engagement member mounted to the body and engageable from above on an item to be cleaned towards a first side of the item, and a second engagement member engageable from above on the item towards an opposite side thereof, whereby the elongate body is positioned above the item to be cleaned, the second engagement member being adjustably mounted on said elongate body so as to be provided at a required spacing from the first engagement member for a particular width of item to be cleaned, the carriage member being movable along a required proportion of the body between the first and second engagement members and the proportion of the elongate body along which the carriage moves being adjustable.

2. An assembly according to claim 1, wherein the second engagement member is slidably mounted on the elongate body.

3. An assembly according to claim 1, wherein means are provided for locking the second engagement member at a required position on the body.

4. An assembly according to claim 1, wherein the first and/or second engagement members include height adjustment means engageable with the item to provide the cleaning member at a required spacing from the item.

5. An assembly according to claim 1, wherein the reciprocal movement providing means includes a selectively rotatable endless line means located in the body, with the carriage member attached to the line means.

6. An assembly according to claim 5, wherein the line means is a belt or chain.

7. An assembly according to claim 1, wherein the speed of reciprocal movement is selectively adjustable.

8. An assembly according to claim 1, wherein the cleaning member includes means for projecting fluid onto the item.

9. An assembly according to claim 8, wherein the fluid is any of steam, water or other liquid, or air.

10. An assembly according to claim 1, wherein the cleaning member is engageable with the item.

11. An assembly according to claim 10, wherein the cleaning member includes any of a rotating or fixed brush, vacuum system, or scraper.

12. An assembly according to claim 1, wherein the assembly includes a removable safety cover.

13. An assembly according to claim 12, wherein the assembly is configured so as to only be operable when the safety cover is in place.

14. An assembly according to claim 12, wherein the safety cover is locatable in formations on the first and second engagement members.

15. An assembly according to claim 14, wherein the formations are slots.

16. An assembly according to claim 1, wherein the proportion of the elongate body along which the carriage moves is manually adjustable.

17. An assembly according to claim 1, wherein one or more sensors is provided on the elongate body to detect the position of the carriage to cause a required limitation of the movement thereof along the body.

18. An assembly according to claim 1, wherein the assembly is arranged such that the proportion of the elongate body along which the carriage moves is automatically determined by the location of the second engagement member on the elongate body.

19. In combination, an item to be cleaned and a portable cleaning assembly for cleaning the item, the assembly including an elongate reciprocal movement providing means, said means including an elongate body and a carriage member movable in a reciprocal manner along the body, a cleaning member mounted on the carriage for cleaning the item, the assembly also including a first engagement member mounted to the body and engageable from above on the item to be cleaned towards a first side of the item, and a second engagement member engageable from above on the item towards an opposite side thereof, whereby the elongate body is positioned above the item to be cleaned, the second engagement member being adjustably mounted on said elongate body so as to be provided at a required spacing from the first engagement member for a particular width of item to be cleaned, the carriage member being movable along a required proportion of the body between the first and second engagement members and the proportion of the elongate body along which the carriage moves being adjustable.

20. A combination according to claim 19, wherein the item to be cleaned is a conveyor comprising a belt and first and second side structures located to opposite respective sides of the belt, and the first and second engagement members are engageable from above on the first and second side structures respectively whereby the cleaning member may be used for cleaning the belt.

* * * * *